(12) United States Patent
Wei et al.

(10) Patent No.: US 12,063,564 B2
(45) Date of Patent: *Aug. 13, 2024

(54) TELECOMMUNICATIONS SYSTEM, TERMINAL DEVICE, INFRASTRUCTURE EQUIPMENT AND METHODS

(71) Applicants: Sony Group Corporation, Tokyo (JP); Sony Mobile Communications Inc., Tokyo (JP)

(72) Inventors: Yuxin Wei, Basingstoke (GB); Brian Alexander Martin, Basingstoke (GB); Anders Berggren, Lund (SE); Lars Nord, Lund (SE)

(73) Assignees: SONY GROUP CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/297,650

(22) Filed: Apr. 10, 2023

(65) Prior Publication Data

US 2023/0247505 A1    Aug. 3, 2023

Related U.S. Application Data

(63) Continuation of application No. 17/145,731, filed on Jan. 11, 2021, now Pat. No. 11,627,509, which is a (Continued)

(30) Foreign Application Priority Data

Aug. 12, 2016    (EP) .................................... 16183964

(51) Int. Cl.
H04W 36/00    (2009.01)
H04W 24/10    (2009.01)
(Continued)

(52) U.S. Cl.
CPC .......... *H04W 36/08* (2013.01); *H04W 24/10* (2013.01); *H04W 36/0033* (2013.01);
(Continued)

(58) Field of Classification Search
None
See application file for complete search history.

(56) References Cited

U.S. PATENT DOCUMENTS 9,622,134 B2 *    4/2017    Sundararajan .... H04W 36/0069
10,257,078 B2    4/2019    Faccin et al.
(Continued)

OTHER PUBLICATIONS

Holma et al., "LTE for UMTS OFDMA and SC-FDMA Based Radio Access", System Architecture based on 3GPP SAE, ISBN 978-0-470-99401-6, Wiley 2009, 11 pages.
(Continued)

*Primary Examiner* — Gerald A Smarth
(74) *Attorney, Agent, or Firm* — XSENSUS LLP

(57) ABSTRACT

A wireless telecommunications system including a terminal device; first infrastructure equipment operable to communicate with the terminal device using a first radio access technology (RAT) and second infrastructure equipment operable to communicate with the terminal device using a second RAT. During a handover procedure for handover from the first infrastructure equipment as a source master infrastructure equipment to a third infrastructure equipment as a target master infrastructure equipment, the second infrastructure equipment is operable to communicate with the third infrastructure equipment using an interface associated with the second RAT so as to allow information necessary for completing the handover to be exchanged between the first infrastructure equipment and the third infrastructure equipment via the second infrastructure equipment.

19 Claims, 11 Drawing Sheets

Related U.S. Application Data continuation of application No. 16/323,784, filed as application No. PCT/EP2017/068249 on Jul. 19, 2017, now Pat. No. 10,893,449.

(51) Int. Cl.

| | | |
|---|---|---|
| *H04W 36/08* | (2009.01) | |
| *H04W 36/14* | (2009.01) | |
| *H04W 74/0833* | (2024.01) | |
| *H04W 76/27* | (2018.01) | |
| *H04W 76/30* | (2018.01) | |
| *H04W 84/02* | (2009.01) | |

(52) U.S. Cl.
 CPC ... *H04W 36/0066* (2013.01); *H04W 36/0069* (2018.08); *H04W 36/14* (2013.01); *H04W 74/0833* (2013.01); *H04W 76/27* (2018.02); *H04W 76/30* (2018.02); *H04W 84/02* (2013.01)

(56) References Cited

U.S. PATENT DOCUMENTS

| | | | |
|---|---|---|---|
| 10,624,016 B2 * | 4/2020 | Li | H04W 36/0009 |
| 2007/0293224 A1 | 12/2007 | Wang et al. | |
| 2013/0294403 A1 | 11/2013 | Srinivasan | |
| 2014/0036762 A1 | 2/2014 | Al-Shalash | |
| 2014/0092835 A1 | 4/2014 | Athley et al. | |
| 2016/0105838 A1 | 4/2016 | Wang et al. | |
| 2017/0111841 A1 | 4/2017 | Henttonen et al. | |
| 2017/0195935 A1 * | 7/2017 | Xu | H04W 36/18 |
| 2017/0245181 A1 | 8/2017 | Zhang et al. | |
| 2018/0049090 A1 | 2/2018 | Wang | |

OTHER PUBLICATIONS

Nokia, Alcatel-Lucent Shanghai Bell, "Deployment Scenarios for Interworking", 3GPP TSG-RAN WG2 Meeting No. 93bis R2-162364, Dubrovnik, Croatia, Apr. 11-15, 2016, 3 pages.
NTT Docomo, "New SID Proposal: Study on New Radio Access Technology", 3GPP TSG RAN Meeting No. 71 RP-160671, Göteborg, Sweden, Mar. 7-10, 2016, 8 pages.
CATT, "Discussion on mobility procedures of aggregation bearer", 3GPP TSG RAN WG2 Meeting No. 90 R2-152126, Fukuoka, Japan, May 25-29, 2015, pp. 1-4.
NEC, "LTE handover preparation for mobility enhancements", 3GPP TSG RAN WG2 Meeting No. 94 R2-163973, Nanjing, China, May 23-27, 2016, pp. 1-3.
Ericsson, "NR/LTE tight interworking: CP requirements on Mobility and Dual Connectivity", 3GPP TSG-RAN WG2 #94 Tdoc R2-163993, Nanjing, China, May 23-27, 2016, pp. 1-5.
Ericsson, Qualcomm Incorporated, "Tight NR/LTE interworking and stand-alone NR access", 3GPP TSG RAN3#92 R3-161294, Nanjing, P.R. China, May 23-27, 2016, pp. 1-3.
3GPP, "Technical Specification Group Radio Access Network; Evolved Universal Terrestrial Radio Access (E-UTRA) and Evolved Universal Terrestrial Radio Access Network (E-UTRAN)", Stage 2, 3GPP TS 36.300 version 13.4.0 Release 13, Jun. 2016, 314 pages.
International Search Report mailed on Dec. 1, 2017 for PCT/EP2017/068249 filed on Jul. 19, 2017, 24 pages.

* cited by examiner

TELECOMMUNICATIONS SYSTEM, TERMINAL DEVICE, INFRASTRUCTURE EQUIPMENT AND METHODS

CROSS-REFERENCE TO RELATED APPLICATIONS

The present application is a continuation of U.S. patent application Ser. No. 17/145,731, filed Jan. 11, 2021, which is a continuation of U.S. patent application Ser. No. 16/323,784, filed Feb. 7, 2019 (now U.S. Pat. No. 10,893,449), which is based on PCT filing PCT/EP2017/068249, filed Jul. 19, 2017, and claims priority to European Patent Application No. 16183964.2, filed Aug. 12, 2016, the entire contents of each of which being incorporated herein by reference.

BACKGROUND

Field

The present disclosure relates to telecommunications system, terminal device, infrastructure equipment and methods, and in particular, but not exclusively, to methods and apparatus for controlling handover procedures in wireless telecommunications systems.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architecture are able to support more sophisticated services than simple voice and messaging services offered by previous generations of mobile telecommunication systems. For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage area of these networks, i.e. geographic locations where access to the networks is possible, is expected to increase rapidly. However, whilst fourth generation networks can support communications at high data rate and low latencies from devices such as smart phones and tablet computers, it is expected that future wireless communications networks, will be expected to efficiently support communications with a much wider range of devices associated with a wider range of data traffic profiles, for example including reduced complexity devices, machine type communication devices, high resolution video displays and virtual reality headsets. Some of these different types of devices may be deployed in very large numbers, for example low complexity devices for supporting the "The Internet of Things", and may typically be associated with the transmissions of relatively small amounts of data with relatively high latency tolerance, whereas other types of device, for example supporting high-definition video streaming, may be associated with transmissions of relatively large amounts of data with relatively low latency tolerance.

There is therefore expected to be a desire for future wireless communications networks, which may be referred to as 5G or new radio access technology (which may be denoted new RAT or, simply, NR) networks, to efficiently support connectivity for a wide range of devices associated with different applications with different characteristic data traffic profiles, resulting in different devices have different operating characteristics/requirements, such as:

High latency tolerance
High data rates
Millimetre wave spectrum use
High density of network nodes (e.g. small cell and relay nodes)
Large system capacity
Large numbers of devices (e.g. MTC devices/Internet of Things devices)
High reliability (e.g. for vehicle safety applications, such as self-driving cars).
Low device cost and energy consumption
Flexible spectrum usage
Flexible mobility The introduction of new radio access technology (RAT) systems/networks therefore gives rise to new challenges for providing efficient operation for devices operating in new RAT networks, including devices able to operate in both new RAT networks (e.g. a 3GPP 5G network) and currently deployed RAT networks (e.g. a 3GPP 4G network). One particular area where new approaches may be helpful is in relation to handovers between network nodes responsible for communicating with a terminal device, which may be referred to as mobility management. It will be appreciated that handovers may result from a device physically moving between coverage areas of different cells or from changing radio conditions associated with different cells for a static device, and the term mobility management may be used for both scenarios.

With current mobile telecommunications systems, such as those based on the 3GPP defined UMTS and Long Term Evolution (LTE) based architectures, handover procedures are carried out on the basis of measurements of downlink signals broadcast by each of the network nodes. These measurements are performed by terminal devices and network node selection, reselection or handover is then performed on the basis of these measurements so as to allow each terminal device to communicate with the network.

However, existing approaches for handling mobility, with the associated measurement report signalling, handover signalling and evaluation procedures, require a relatively large number of messages to be exchanged, which results in a relatively high control signalling overhead and increased chance of handover failure, particularly in the case of small cells and/or fast moving terminal devices, because of the time taken to perform the measurements and signalling. This is a problem which is likely to need particular consideration in view of the introduction of NR systems. In particular, there is a need to efficiently manage mobility between network nodes operating using existing RATs (such as LTE) and network nodes operating using new RATs.

There is therefore a desire to provide for new approaches for handling mobility in wireless telecommunications systems.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DESCRIPTION OF EXAMPLE EMBODIMENTS

Figure 1:
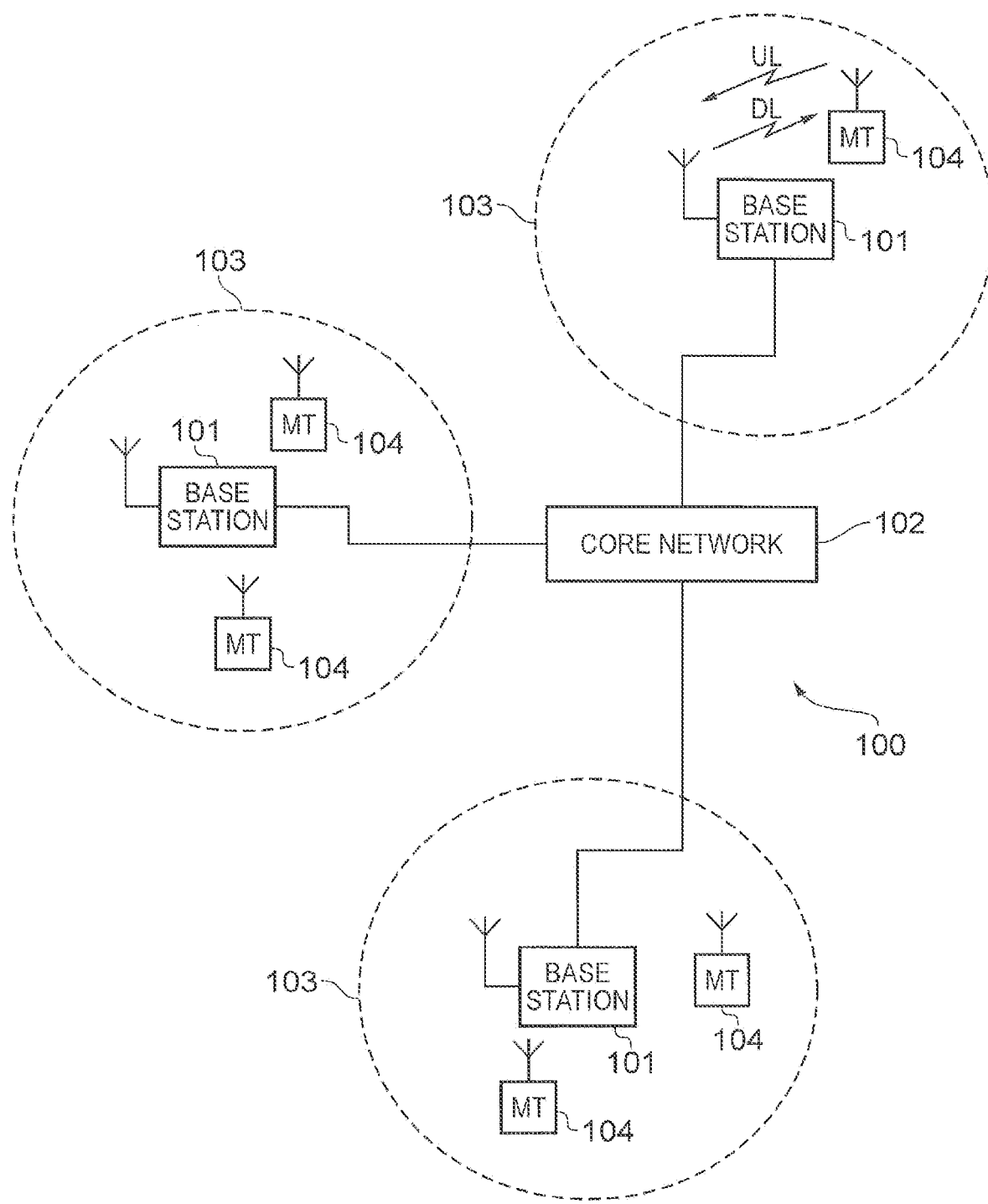
FIG. 1 schematically represents some elements of a conventional LTE-based mobile telecommunications network/system.

FIG. 1 is a schematic diagram illustrating a network architecture for an LTE-based wireless mobile telecommunications network/system 100. Various elements of FIG. 1 and their respective modes of operation are well-known and defined in the relevant standards administered by the 3GPP® body, and also described in many books on the subject, for example, Holma H. and Toskala A [1]. It will be appreciated that operational aspects of the telecommunications network represented in FIG. 1, and of other networks discussed herein in accordance with embodiments of the disclosure, which are not specifically described (for example in relation to specific communication protocols and physical channels for communicating between different elements) may be implemented in accordance with any known techniques, for example according to currently used approaches for implementing such operational aspects of wireless telecommunications systems, e.g. in accordance with the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment, may also be referred to as transceiver stations/nodeBs/e-nodeBs (eNBs), and so forth.

In terms of broad top-level functionality, the network architecture of a new RAT will have a similar general arrangement to that shown for current LTE networks in FIG. 1. In particular, a new RAT network architecture will include a core network component, a number of base stations and a number of terminal devices which operate together so as to allow exchange of data between terminal devices on the network. It will be appreciated that operational aspects of a new RAT network (for example in relation to specific communication protocols and physical channels for communicating between different elements) may be different to those known from LTE or other known mobile telecommunications standards. However, it will also be appreciated that each of the core network component, base stations and terminal devices of a new RAT network will be functionally similar to, respectively, the core network component, base stations and terminal devices of FIG. 1. In particular, in the new RAT, each base station will be connected to the core network. Each base station will provide a coverage area (i.e. a cell) within which data can be communicated to and from terminal devices. Data will be transmitted from base stations to terminal devices within their respective coverage areas via a radio downlink. Data will be transmitted from terminal devices to the base stations via a radio uplink. The core network will route data to and from the terminal devices via the respective base stations. This functional equivalence is sufficient for an understanding of the present technique.

In 3GPP a Study Item (SI) on New Radio Access Technology (NR) has been agreed [2]. This SI is to study and to develop a new Radio Access Technology (RAT) for the next generation wireless communication system, i.e. 5G. The new RAT is expected to operate in a large range of frequencies, from hundreds of MHz to 100 GHz and it is expected to cover a broad range of use cases. The use cases that are considered under this SI are:

Enhanced Mobile Broadband (eMBB)
Massive Machine Type Communications (mMTC)
Ultra Reliable & Low Latency Communications (URLLC).

In 5G, there are in general two operational modes. These are a tight interworking mode and standalone mode. In tight interworking mode, a 5G NR eNodeB works together with an LTE eNodeB. This may occur using an approach similar to, for example, dual connectivity (as known in LTE), and may include, for example, the LTE eNodeB working as an anchor eNodeB for the 5G NR eNodeB. On the other hand, in standalone mode, a 5G NR eNodeB could work independently without the assistance of an LTE eNodeB. Both of these two operational modes are discussed in [3], for example. The present disclosure relates particularly to managing handover in tight interworking mode in an efficient manner.

In tight interworking mode, a number of different scenarios are possible. These are illustrated in FIGS. 2A-F.

Figure 2:
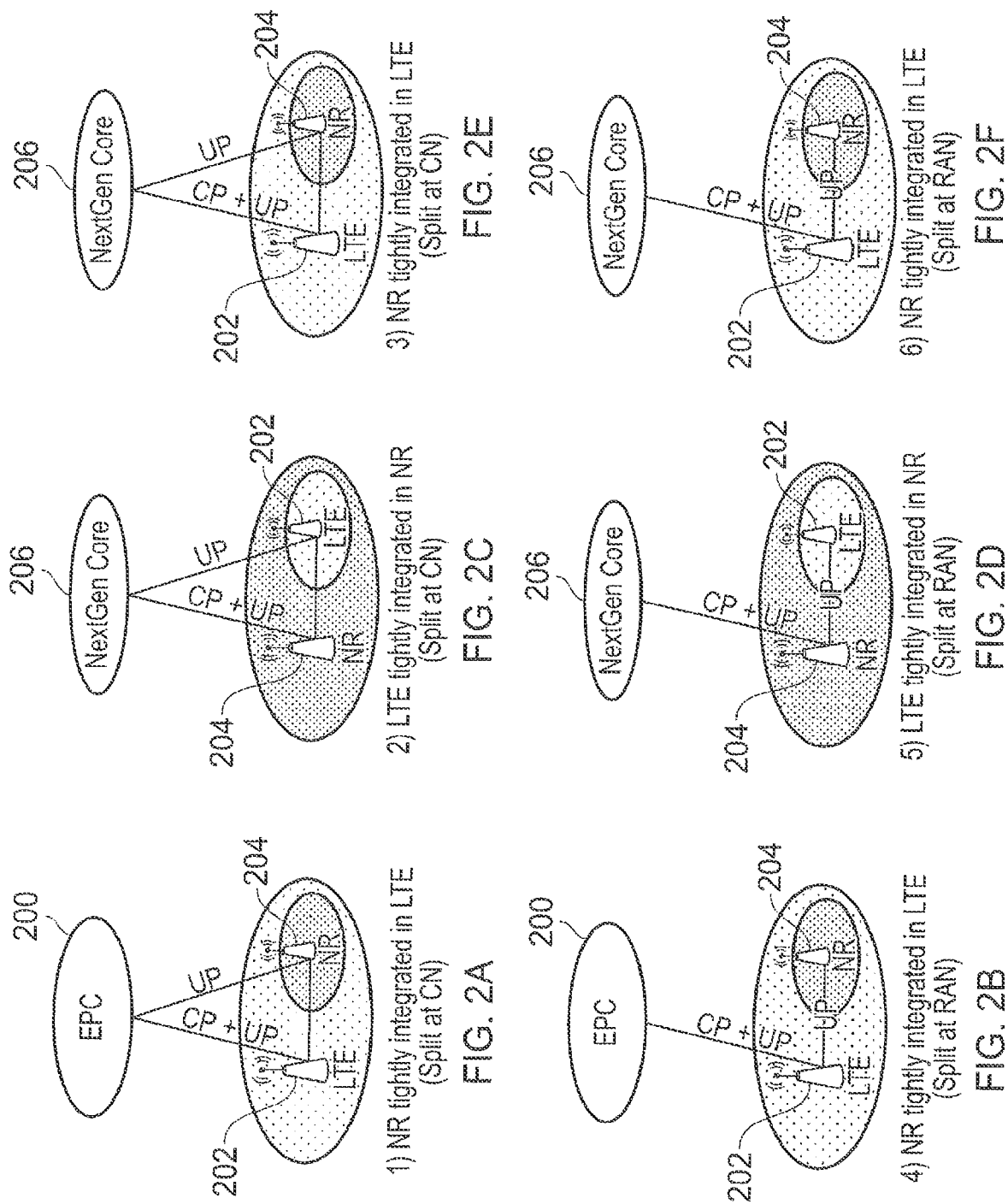
FIGS. 2A-F schematically show a number of different possible scenarios of tight interworking in a mobile telecommunications network/system.

FIGS. 2A and 2B each show a tight interworking mode in which NR is tightly integrated in LTE via an Evolved Packet Core (EPC) core network 200 (known from LTE). In this case, an LTE eNB 202 forms a master eNB (MeNB) with which both control plane (CP) signalling and user plane (UP) data is exchangeable with a terminal device of the network and an NR eNB 204 forms a secondary eNB (SeNB) with which only UP data is exchangeable with a terminal device of the network (that is, no CP signalling is exchangeable between the NR eNB and a terminal device). FIG. 2A shows an arrangement in which the UP data is split at the core network (CN) 200 so that all UP data may be exchanged between the NR eNB 204 (SeNB) and the CN 200 without having to go via the LTE eNB 202 (MeNB). FIG. 2B shows an alternative arrangement in which UP data is split at the radio access network (RAN) level so that all UP data exchanged between the NR eNB 204 (SeNB) and the CN 200 is exchanged via the LTE eNB 202 (MeNB).

FIGS. 2C and 2D each show a tight interworking mode in which LTE is tightly integrated in NR via a next generation core network 206. Such a next generation core network (CN) may be standardised so as to interoperate with NR, for example. Specific details of the next generation CN 206 are not required for an understanding of the present technique, however. In this scenario, an NR eNB 204 forms a master eNB (MeNB) with which both control plane (CP) signalling and user plane (UP) data is exchangeable with a terminal device of the network and an LTE eNB 202 forms a secondary eNB (SeNB) with which only UP data is exchangeable with a terminal device of the network (that is, no CP signalling is exchangeable between the LTE eNB and a terminal device). FIG. 2C shows an arrangement in which the UP data is split at the core network (CN) 206 so that all UP data may be exchanged between the LTE eNB 202 (SeNB) and the CN 206 without having to go via the NR eNB 204 (MeNB). FIG. 2B shows an alternative arrangement in which UP data is split at the radio access network (RAN) level so that all UP data exchanged between the LTE eNB 202 (SeNB) and the CN 206 is exchanged via the NR eNB 204 (MeNB).

FIGS. 2E and 2F each show a tight interworking mode in which NR is again tightly integrated in LTE. This time, however, the tight integration occurs via next generation CN 206 rather than EPC 200. This situation remains similar to that shown in FIGS. 2A and 2B, however. In this case, an LTE eNB 202 forms a master eNB (MeNB) with which both control plane (CP) signalling and user plane (UP) data is exchangeable with a terminal device of the network and an NR eNB 204 forms a secondary eNB (SeNB) with which only UP data is exchangeable with a terminal device of the network (that is, no CP signalling is exchangeable between the NR eNB and a terminal device). FIG. 2E shows an arrangement in which the UP data is split at the core network (CN) 206 so that all UP data may be exchanged between the NR eNB 204 (SeNB) and the CN 206 without having to go via the LTE eNB 202 (MeNB). FIG. 2F shows an alternative arrangement in which UP data is split at the radio access network (RAN) level so that all UP data exchanged between the NR eNB 204 (SeNB) and the CN 206 is exchanged via the LTE eNB 202 (MeNB).

With the tight interworking network arrangements shown in FIGS. 2A-F, it is desirable to enable handover from one tight interworking network arrangement to another whilst reducing the core network signalling overhead and mitigating data packet loss. In particular, this is desirable when handing over from a first tight interworking arrangement with a MeNB operating using a first RAT (such as LTE) and a SeNB operating using a second RAT (such as NR) to a second tight interworking arrangement with a MeNB operating using the second RAT (such as NR) and a SeNB operating using the first RAT (such as LTE). The present technique is thus principally directed to this scenario.

Figure 3:
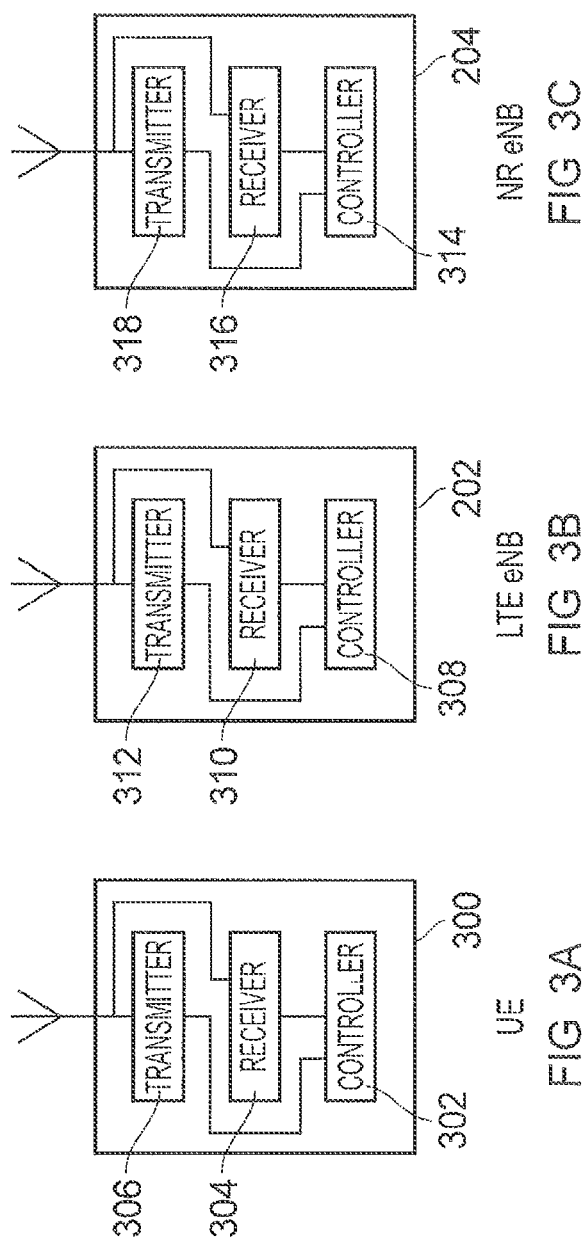
FIGS. 3A-C schematically show a terminal device, an eNB operating in accordance with a first RAT and an eNB operating in accordance with a second RAT, the first RAT being different to the second RAT.

In order to help describe the present technique, FIGS. 3A-C schematically show a terminal device, an eNB operating in accordance with a first RAT and an eNB operating in accordance with a second RAT, the first RAT being different to the second RAT. In this particular example, the first RAT is LTE and the second RAT is NR.

FIG. 3A shows a terminal device 300. The terminal device 300 comprises a transmitter 306 configured to transmit wireless signals, a receiver 304 configured to receive wireless signals and a controller 302 configured to control the terminal device 300. The transmitter 306 and receiver 304 together form a transceiver. FIG. 3B shows an LTE eNB 202. The eNB 202 operates in accordance with LTE, LTE being the first RAT. The eNB 202 comprises a transmitter 312 configured to transmit wireless signals, a receiver 310 configured to receive wireless signals and a controller 308 configured to control the eNB 202. The transmitter 312 and receiver 310 together form a transceiver. FIG. 3C shows a NR eNB 204. The eNB 204 operates in accordance with NR, NR being the second RAT. The eNB 204 comprises a transmitter 318 configured to transmit wireless signals, a receiver 316 configured to receive wireless signals and a controller 314 configured to control the eNB 204. The transmitter 318 and receiver 316 together form a transceiver. In the following description, it will be appreciated that signals which are transmitted and received between a terminal device 300 and another network entity are, respectively, transmitted by the transmitter 306 and received by the receiver 304 under control of the controller 302. Also, signals which are transmitted and received between an LTE eNB 202 and another network entity are, respectively, transmitted by the transmitter 312 and received by the receiver 310 under control of the controller 308. Similarly, signals which are transmitted and received between an NR eNB 202 and another network entity are, respectively, transmitted by the transmitter 318 and received by the receiver 316 under control of the controller 314. The operation of a wireless telecommunications system comprising one or more terminal devices 300, one or more LTE eNBs 202 and one or more NR eNBs 204 in accordance with the present technique is controlled by one or more of the controllers 302, 308 and 314.

According to an arrangement of the present disclosure, there is provided wireless telecommunications system. The wireless telecommunications system comprises a terminal device, first infrastructure equipment, second infrastructure equipment and third infrastructure equipment. The first infrastructure equipment is operable to communicate with the terminal device using a first RAT and the second infrastructure equipment is operable to communicate with the terminal device using a second RAT. The first RAT is different to the second RAT. For example, the first RAT may be LTE whereas the second RAT may be NR. The first infrastructure equipment and second infrastructure equipment form an interworking arrangement (such as an LTE-NR tight interworking arrangement as previously described) in which the first infrastructure equipment is a master infrastructure equipment (such as an MeNB) with which control plane signalling and user plane data is exchangeable with the terminal device and the second infrastructure equipment (such as a SeNB) is a secondary infrastructure equipment with which user plane data is exchangeable with the terminal device. The third infrastructure equipment is operable to communicate with the terminal device using the second RAT. During a handover procedure for handover from the first infrastructure equipment as a source master infrastructure equipment to the third infrastructure equipment as a target master infrastructure equipment, the second infrastructure equipment is operable to communicate with the third infrastructure equipment—using an interface associated with the second RAT (for example, a RAN interface associated with the second RAT) so as to allow information necessary for completing the handover to be exchanged between the first infrastructure equipment and the third infrastructure equipment via the second infrastructure equipment. Thus, with the present disclosure, the information necessary for completing the handover is exchanged between the first infrastructure equipment and the third infrastructure equipment via the second infrastructure equipment rather than via the core network. The signalling overhead associated with the core network is therefore reduced. In addition, due to the time saved for completing handover due to the reduction in the amount of information which needs to be exchanged via the core network, data packet loss is alleviated.

Figure 4:
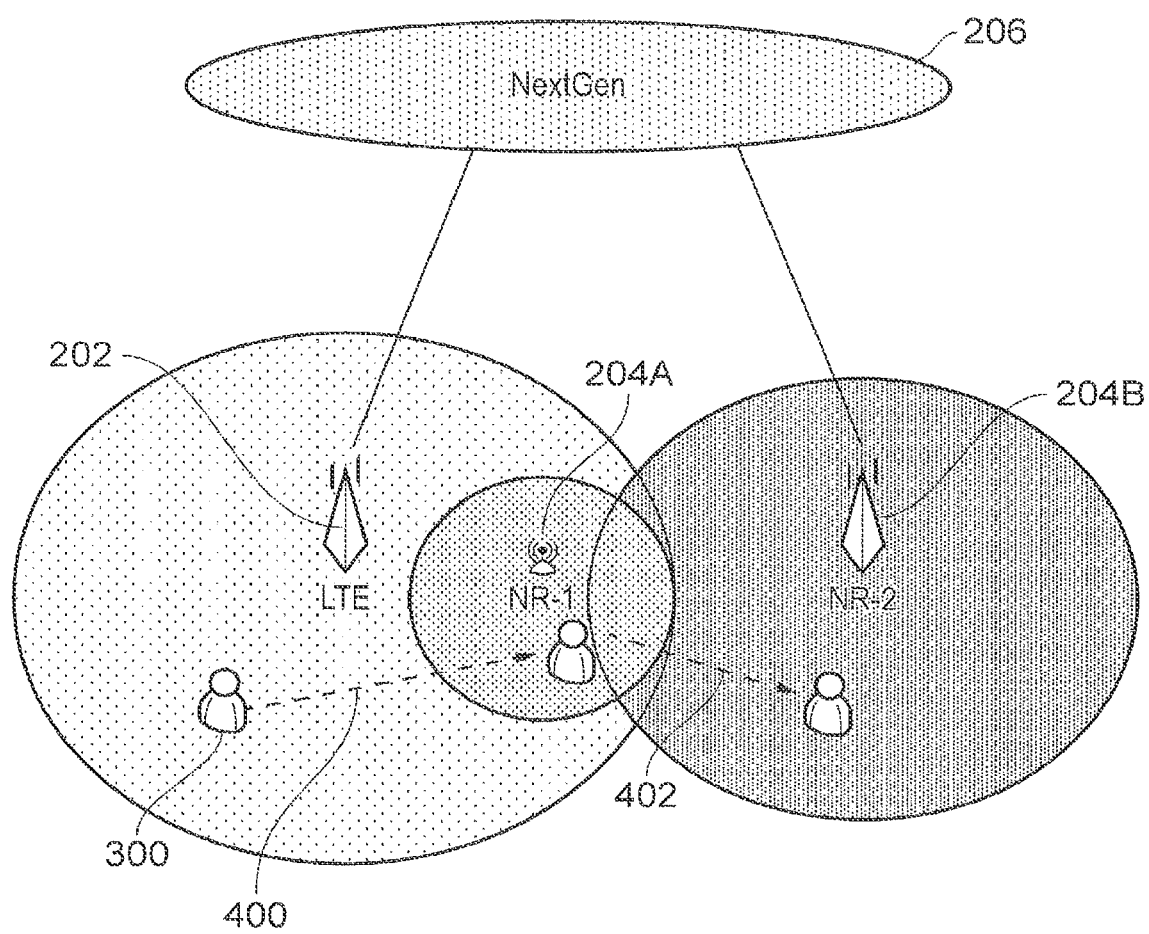
FIG. 4 schematically shows an arrangement of the present disclosure according to one embodiment.

FIG. 4 shows an arrangement of the present disclosure according to one embodiment. The arrangement of FIG. 4 comprises a UE 300, an LTE eNB 202 as first infrastructure equipment, a first NR eNB 204A as second infrastructure equipment and a second NR eNB 204B as third infrastructure equipment. The LTE eNB 202 and NR eNB 204B are connected to a next generation core network 206. In this case, it will be appreciated that LTE is the first RAT and NR is the second RAT. In the arrangement of FIG. 4, the handover procedure for the UE 300 comprises a first handover and a second handover. The first handover occurs from LTE eNB 202 as a source MeNB (S-MeNB) to NR eNB 204A as a target MeNB (T-MeNB). In this case, information necessary for completing the first handover is exchanged between the LTE eNB 202 and the NR eNB 204A on the basis of the interworking arrangement (tight interworking arrangement) formed by LTE eNB 202 and the NR eNB 204A. The second handover then occurs from the NR eNB 204A as an S-MeNB to NR eNB 204B as a T-MeNB. In this case, information necessary for completing the second handover is exchanged between the NR eNB 204A and the NR eNB 204B at the RAN (radio access network) level using NR. It is noted that each of the NR eNBs 204A and 204B have the structure of the NR eNB shown in FIG. 3C. In this embodiment, it will be appreciated that information necessary for completing the handover is exchanged between the LTE eNB 202 (as first infrastructure equipment) and NR eNB 204B (as third infrastructure equipment) via the NR eNB 204A (as second infrastructure equipment) by splitting the handover procedure into the first and second handovers.

Figure 5:
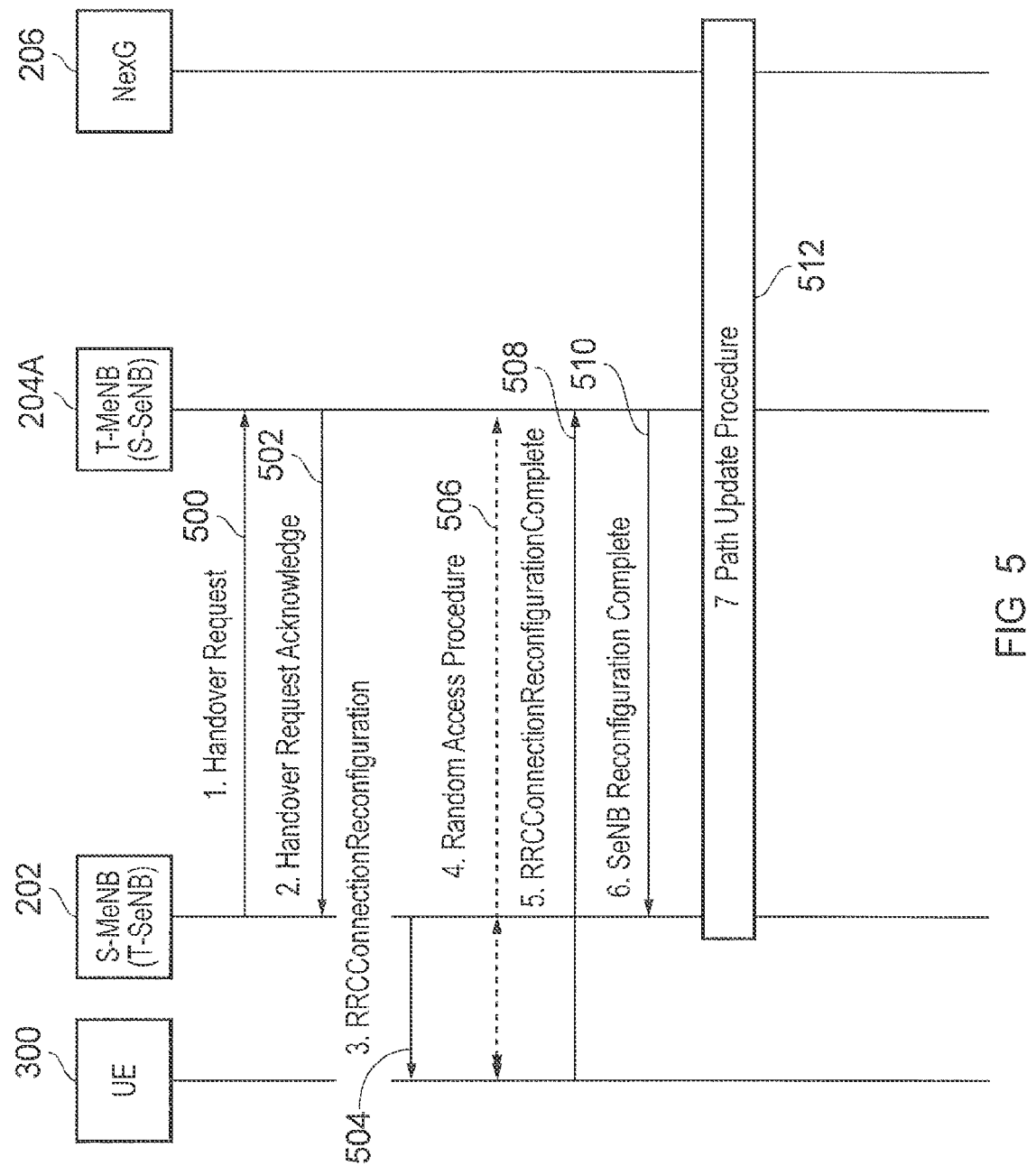
FIG. 5 schematically shows a signalling flow associated with the embodiment of FIG. 4.

FIG. 5 shows an example signal flow between the UE 300, LTE eNB 202, NR eNB 204A and core network 206 for completing the first handover. Firstly, at step 500, a handover request signal is transmitted from the LTE eNB 202 to the NR eNB 204A. At step 502, a handover request acknowledgement signal is transmitted from the NR eNB 204A to the LTE eNB 202. It is noted that the handover request signal and the handover request acknowledgement signal are examples of handover related control signalling. At step 504, the LTE eNB 202 transmits a radio resource control (RRC) connection reconfiguration signal to the UE 300. At step 506, the UE 300 performs a random access procedure in order to establish a connection with the NR eNB 204A. At step 508, the UE 300 transmits an RCC connection reconfiguration completion signal indicating that the RCC connection reconfiguration is complete to the NR eNB 204A. At step 510, the NR eNB 204A transmits a reconfiguration completion signal indicating that the reconfiguration is complete to the LTE eNB 202. At step 512, a path update procedure is then carried out. It is noted that the first handover procedure essentially swaps the MeNB and SeNB in the interworking arrangement shown in FIG. 4. That is, the interworking arrangement shown in FIG. 4 in which the NR eNB 204A is tightly interworking in LTE (so that the LTE eNB 202 is the MeNB and the NR eNB 204A is the SeNB) is swapped so that, after the handover, the LTE eNB 202 is tightly interworking in NR (so that the NR eNB 204A is the MeNB and the LTE eNB 202 is the SeNB). In this sense, for the first handover, the LTE eNB 202 is simultaneously the S-MeNB and the T-SeNB. Similarly, the NR eNB 204A is simultaneously the S-SeNB and the T-MeNB. Once the first handover is completed, the second handover is carried out between the NR eNB 204A and the NR eNB 204B. Since both the NR eNBs 204A and 20B use the same RAT (namely, NR), the second handover is a simple intra-RAT handover and thus is not described in detail here.

It is noted that, in some embodiments, step 506 in FIG. 5 may not be necessary, as the UE 300 is already connected to both the LTE eNB 202 and NR eNB 204A as part of the NR-LTE interworking arrangement. Step 506 is thus only required in the case that the random access resources are changed. Furthermore, data forwarding may not be necessary, as the UE 300 keeps the connection with both the LTE eNB 202 and NR eNB 204A and therefore pending transmissions or retransmissions may be completed using the same transport and physical channel configurations. Data forwarding may be necessary, however, when moving the anchor Packet Data Convergence Protocol (PDCP) entity across RATs, and the handover involves a reconfiguration that would prevent transmission of pending data on the original configuration, such as a security algorithm change, or radio link control (RLC) reset, or when the LTE eNB 202 is added as SeNB after the handover is finished.

In the embodiment of FIG. 4, the first handover may be initiated, for example, when the UE 300 is part of the coverage area of the interworking arrangement in which the NR eNB 204A is tightly integrated in LTE but is moving towards the coverage area provided by the NR eNB 204B (as indicated by arrow 400). The second handover procedure may then be initiated as the UE 300 moves into the coverage area provided by the NR eNB 204B (as indicated by arrow 402).

It is noted that, in another embodiment, a similar procedure to that described with reference to FIGS. 4 and 5 may be applied during a handover procedure from an arrangement in which NR-1 eNB 204A is tightly interworking in LTE eNB 202 (as shown in FIG. 4) to an arrangement in which NR-1 eNB 204A acts as a standalone eNB (that is, an eNB which does is not part of a tightly interworking arrangement).

Figure 6:
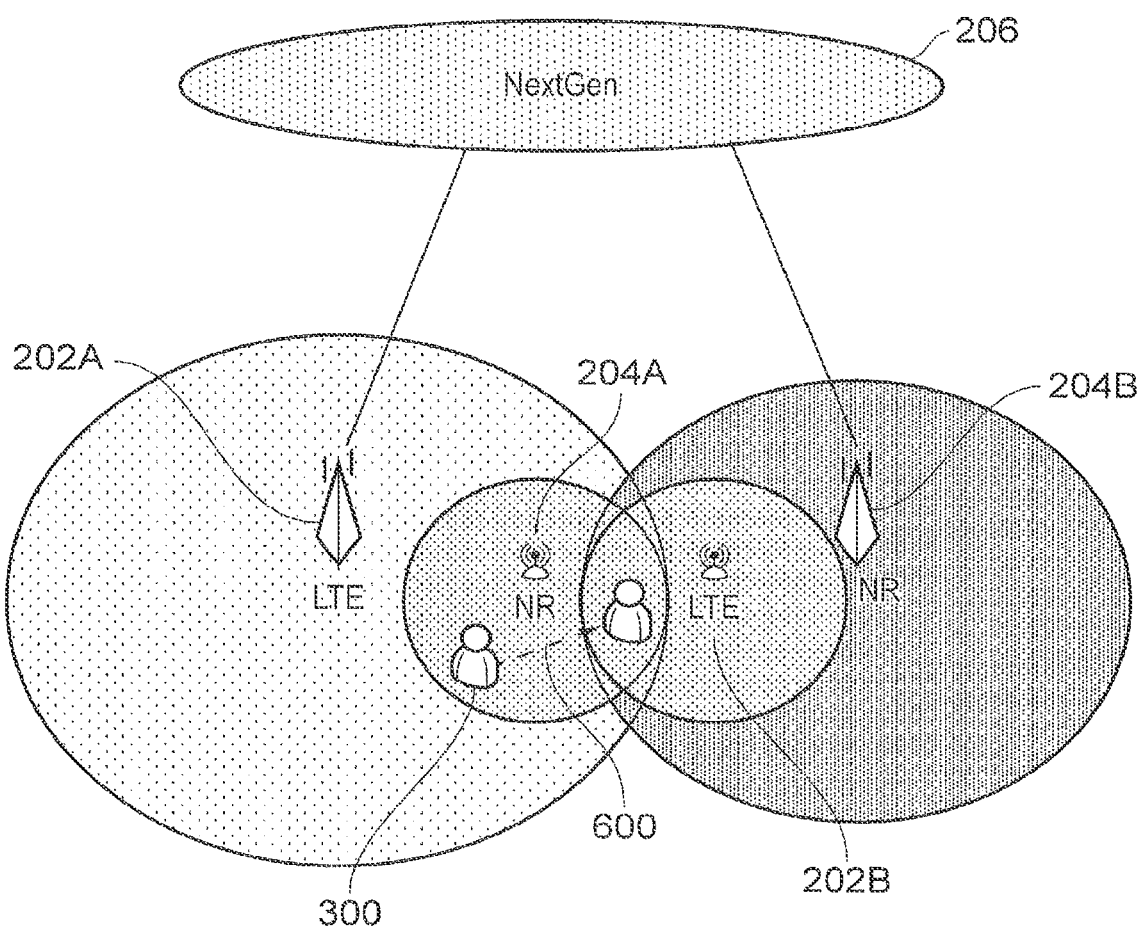
FIG. 6 schematically shows an arrangement of the present disclosure according to another embodiment.

FIG. 6 shows an arrangement of the present disclosure according to another embodiment. Like the arrangement of FIG. 4, the arrangement of FIG. 6 comprises a UE 300, an LTE eNB 202A as first infrastructure equipment, a first NR eNB 204A as second infrastructure equipment and a second NR eNB 204B as third infrastructure equipment. The LTE eNB 202A and NR eNB 204B are again connected to a next generation core network 206. However, the arrangement of FIG. 6 also comprises a second LTE eNB 202B as fourth infrastructure equipment. It is noted that, in this embodiment, each of the LTE eNBs 202A and 202B have the structure of the LTE eNB shown in FIG. 3B.

In this embodiment, the NR eNB 204B and LTE eNB 202B are operable to form an interworking arrangement (such as an LTE-NR tight interworking arrangement as previously described) in which the NR eNB 204B is an MeNB with which control plane signalling and user plane data is exchangeable with the UE 300 and the LTE eNB 202B is an SeNB with which user plane data is exchangeable with the UE 300. The handover procedure for the UE thus involves handover from an arrangement in which NR is tightly interworking in LTE (with LTE eNB 202A as MeNB and NR eNB 204A as SeNB) to an arrangement in which LTE is tightly interworking in NR (with NR eNB 204B as MeNB and LTE eNB 202B as SeNB) as the UE 300 travels in the direction of the arrow 600. In this embodiment, the information necessary for completing the handover which is exchanged between the LTE eNB 202A and the NR eNB 204B via the NR eNB 204A comprises a handover request signal and a handover request acknowledgement signal. Furthermore, in this embodiment, the LTE eNB 202A is operable to communicate with the LTE eNB 202B using LTE (as the first RAT) so as to allow further information necessary for completing the handover from the LTE eNB 202A as S-MeNB to the NR eNB 204B as T-MeNB to be exchanged between the LTE eNB 202A and the LTE eNB 202B. This further information may include, for example, control plane signalling and user plane data which is forwarded from the LTE eNB 202A to the LTE eNB 202B. Similarly, the NR eNB 204A is operable to communicate with the NR eNB 204B using NR (as the second RAT) so as to allow further information necessary for completing the handover from the LTE eNB 202A as S-MeNB to the NR eNB 204B as T-MeNB to be exchanged between the NR eNB 204A and the NR eNB 204B. This further information may include, for example, relevant control plane signalling and user plane data which is forwarded from the NR eNB 204A to the NR eNB 204B.

Figure 7:
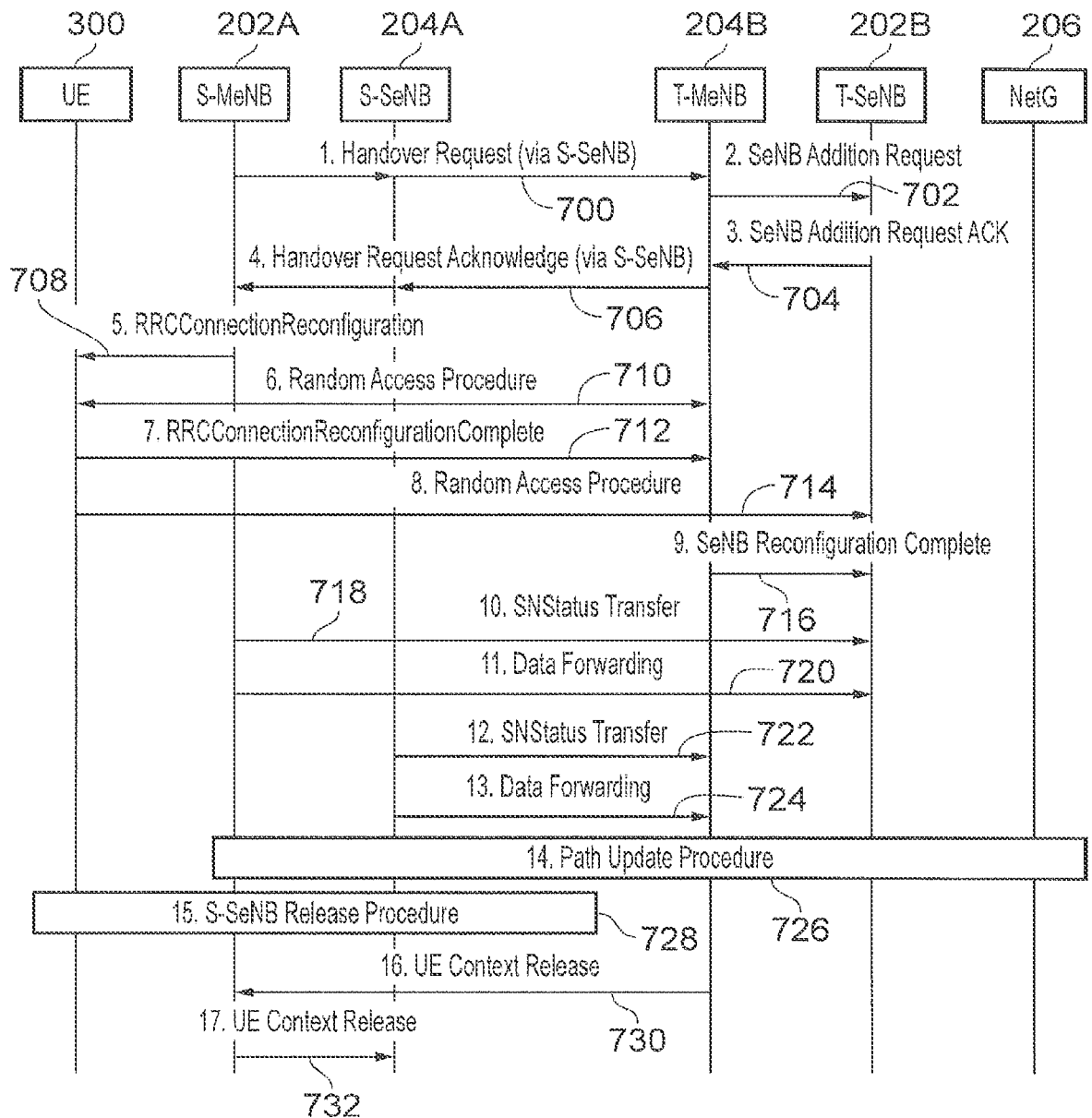
FIG. 7 schematically shows a signalling flow associated with the embodiment of FIG. 6.

An example signal flow between the UE 300, LTE eNB 202A, LTE eNB 202B, NR eNB 204A, NR eNB 204B and core network 206 implemented by the embodiment of FIG. 6 is shown in FIG. 7. At step 700, a handover request signal is transmitted from the LTE eNB 202A to the NR eNB 204B via the NR eNB 204A. More specifically, this handover request signal is transmitted from the LTE eNB 202A to the NR eNB 204A using the tight interworking connection between the LTE eNB 202A and NR eNB 204A, and is then transmitted from the NR eNB 204A to the NR eNB 204B at the RAN level using NR. At step 702, the NR eNB 204B transmits a SeNB addition request signal to the LTE eNB 202B. The SeNB addition request signal requests that the LTE eNB 202B becomes a SeNB interworking with the NR eNB 204B as a MeNB, thus establishing the interworking arrangement between the NR eNB 204B and the LTE eNB 202B. At step 704, the LTE eNB 202B transmits an addition request acknowledgement signal to the NR eNB 204B. The addition request acknowledgement signal indicates to the NR eNB 204B that the LTE eNB 202B is able to become a SeNB interworking with the NR eNB 204B as a MeNB. At step 706, a handover request acknowledgement signal is transmitted from the NR eNB 204B to the LTE eNB 202A via the NR eNB 204A. More specifically, this handover request acknowledgement signal is transmitted from the NR eNB 204B to the NR eNB 204A at the RAN level using NR, and is then transmitted from the NR eNB 204A to the LTE eNB 202A using the tight interworking connection between the NR eNB 204A and the LTE eNB 202A. At step 708, an RRC connection reconfiguration signal is transmitted from the LTE eNB 202A to the UE 300. At step 710, the UE 300 performs a random access procedure in order to establish a connection with the NR eNB 204B. At step 712, the UE 300 transmits an RCC connection reconfiguration completion signal indicating that the RCC connection reconfiguration is complete to the NR eNB 204B. At step 714, the UE 300 performs a random access procedure in order to establish a connection with the LTE eNB 202B. At step 716, the NR eNB 204B transmits a SeNB reconfiguration completion signal to the LTE eNB 204B. This indicates to the LTE eNB 204B that the reconfiguration to make the LTE eNB 204B the SeNB in the interworking arrangement with the NR eNB 202B as MeNB is complete. At steps 718 and 720, the LTE eNB 202A forwards, respectively, relevant control plane signalling and user plane data to the LTE eNB 202B at the RAN level using LTE. Similarly, at steps 722 and 724, the NR eNB 204A forwards, respectively, relevant control plane signalling and user plane data to the NR eNB 204B at the RAN level using NR. At step 726, a path update procedure is implemented. At step 728, an S-SeNB release procedure is implemented. This releases the NR eNB 204A, thus ending the interworking arrangement between the LTE eNB 202A and the NR eNB 204A. At step 730, the NR eNB 204B (now the MeNB, with the LTE eNB 202B as the SeNB) transmits a UE context release signal to the LTE eNB 202A (as source MeNB). The LTE eNB 202A then transmits a context release signal to the NR eNB 204A (as source SeNB) at step 732. This completes the handover procedure.

It will be appreciated that, with the present embodiment, by exchanging certain information necessary for completing the handover (such as the handover request/handover request acknowledgement signals (steps 700, 706) and the control plane signalling and user plane data (steps 718, 720, 722, 725)) in the way described rather than via the core network 106, the core network signalling overhead is reduced and data packet loss is alleviated.

It is noted that the handover concept depicted in FIGS. 4 and 5 (including the initial swap of which eNB in an interworking arrangement is the MeNB) may be extended to the arrangement of FIG. 6. For example, there may be a first handover from NR eNB 204A tightly interworking with LTE eNB 202A to LTE eNB 202A tightly interworking with NR eNB 204A (this essentially constituting a swap from the LTE eNB 202A being the MeNB in the interworking arrangement to the NR eNB 204A being the MeNB in the interworking arrangement). There may then be a second handover (this being an intra-RAT inter-MeNB handover) from LTE eNB 202A tightly interworking with NR eNB 204A to LTE eNB 202B tightly interworking with NR eNB 204B. In this case, the first handover can adopt the procedure as depicted in FIG. 5.

Figure 8:
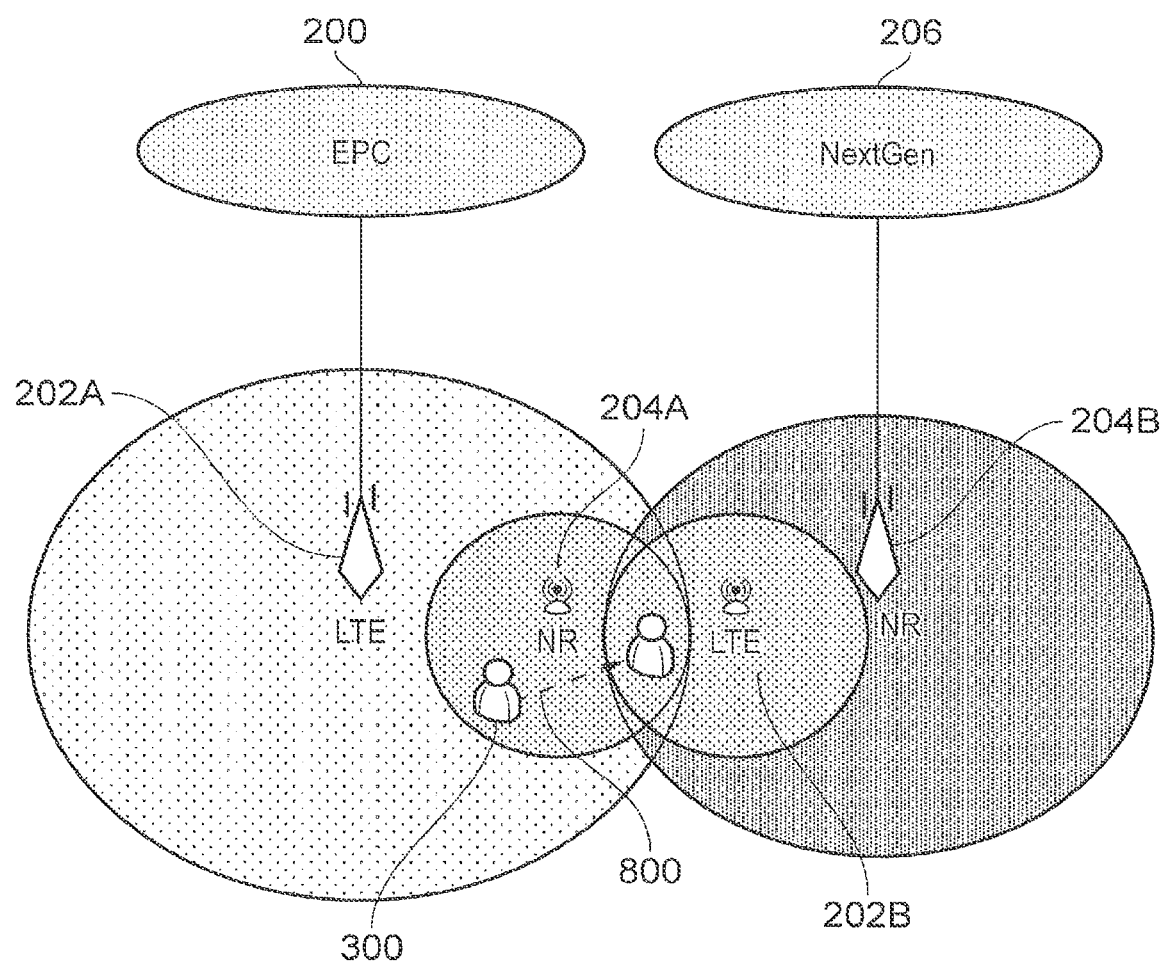
FIG. 8 schematically shows an arrangement of the present disclosure according to another embodiment.

FIG. 8 shows an arrangement of the present disclosure according to another embodiment. The embodiment of FIG. 8 is the same as that of FIG. 6, except that, this time, the LTE eNB 202A is connected to an EPC core network 200 whereas the NR eNB 204B is connected to a next generation core network 206. In this case, in order to facilitate handover as the UE 300 moves in the direction of arrow 800, the signalling flow may be different depending when the S-SeNB connection (that is, the connection between the UE 300 and the NR eNB 204A) is released during the handover. Two different example signalling flows are given with reference to FIGS. 9 and 10.

Figure 9:
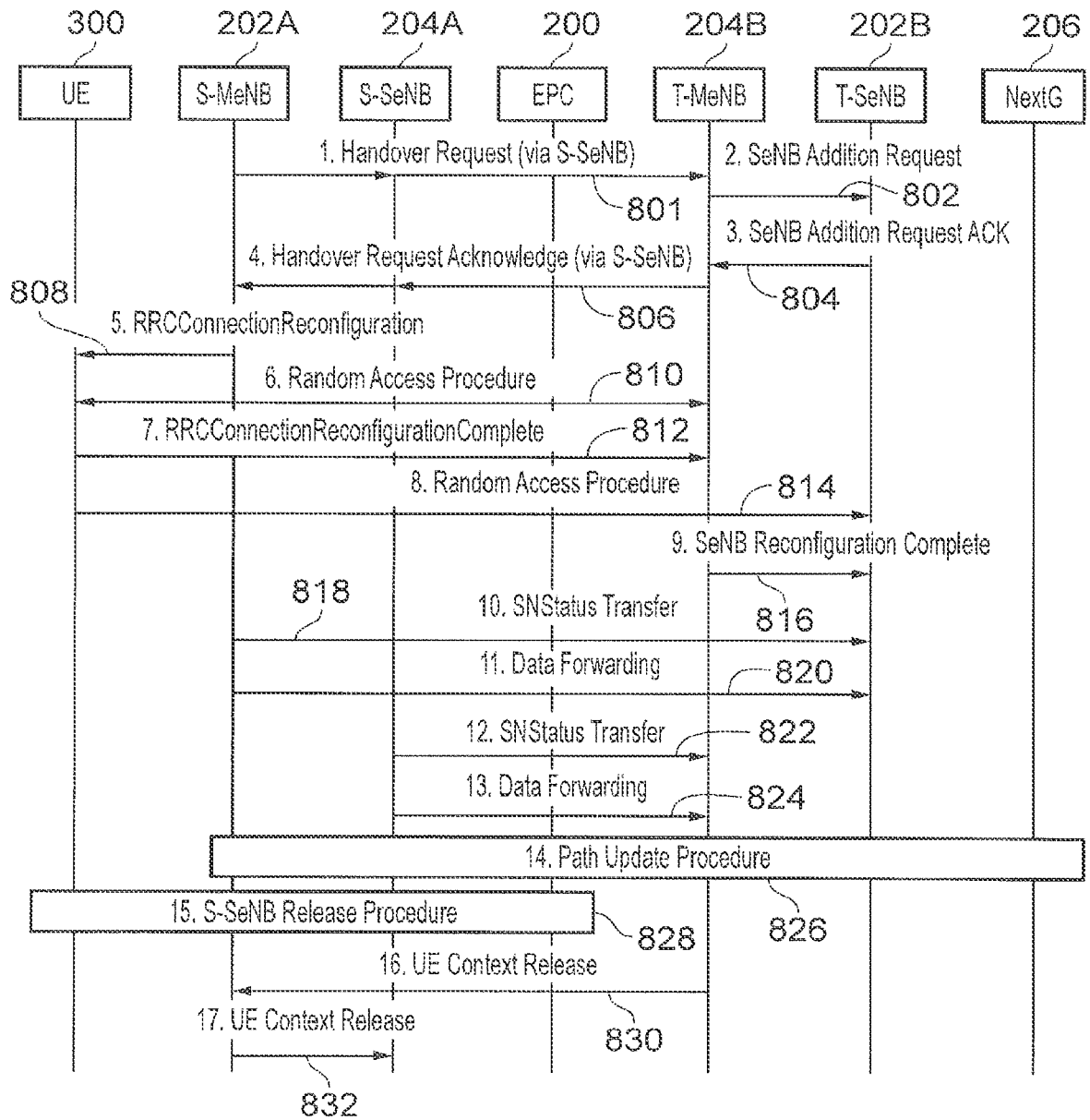
FIG. 9 schematically shows a first example signalling flow associated with the embodiment of FIG. 8.

An first example signal flow between the UE 300, LTE eNB 202A, LTE eNB 202B, NR eNB 204A, NR eNB 204B, core network 206 and core network 200 implemented by the embodiment of FIG. 8 is shown in FIG. 9. With this scheme, the S-SeNB (in this case, the NR eNB 204A) will not be released until the path update procedure is finished. In order to reduce the core level signalling overhand and alleviate data packet loss, the source MeNB (in this case, LTE eNB 202A) will forward the data packets to target SeNB (in this case, LTE eNB 202B) if there is a RAN interface between them (which there is in this case, the RAN interface being an LTE interface). Similarly, the source SeNB (in this case, NR eNB 204A) will forward the data packets to target MeNB (in this case, NR eNB 204B) if there is a RAN interface between them (which there is in this case, the RAN interface being an NR interface). The source SeNB is then released once the path update procedure is finished. A detailed description of FIG. 9 is now provided.

At step 801, a handover request signal is transmitted from the LTE eNB 202A to the NR eNB 204B via the NR eNB 204A. More specifically, this handover request signal is transmitted from the LTE eNB 202A to the NR eNB 204A using the tight interworking connection between the LTE eNB 202A and NR eNB 204A, and is then transmitted from the NR eNB 204A to the NR eNB 204B at the RAN level using NR. Alternatively, in the case that there is a RAN level interface between eNB 202A and eNB 204B (for example, in the case that both eNBs used LTE or NR), then it will be appreciated that the handover request signal could be transmitted directly from eNB 202A (as S-MeNB) to eNB 204B (as T-MeNB). At step 802, the NR eNB 204B transmits a SeNB addition request signal to the LTE eNB 202B. The SeNB addition request signal requests that the LTE eNB 202B becomes a SeNB interworking with the NR eNB 204B as a MeNB, thus establishing the interworking arrangement between the NR eNB 204B and the LTE eNB 202B. At step 804, the LTE eNB 202B transmits an addition request acknowledgement signal to the NR eNB 204B. The addition request acknowledgement signal indicates to the NR eNB 204B that the LTE eNB 202B is able to become a SeNB interworking with the NR eNB 204B as a MeNB. At step 806, a handover request acknowledgement signal is transmitted from the NR eNB 204B to the LTE eNB 202A via the NR eNB 204A. More specifically, this handover request acknowledgement signal is transmitted from the NR eNB 204B to the NR eNB 204A at the RAN level using NR, and is then transmitted from the NR eNB 204A to the LTE eNB 202A using the tight interworking connection between the NR eNB 204A and the LTE eNB 202A. Alternatively, in the case that there is a RAN level interface between eNB 202A and eNB 204B (for example, in the case that both eNBs used LTE or NR), then it will be appreciated that the handover request acknowledgement signal could be transmitted directly from eNB 204B (as T-MeNB) to eNB 202A (as S-MeNB) At step 808, an RRC connection reconfiguration signal is transmitted from the LTE eNB 202A to the UE 300. The RRC connection reconfiguration signal may include configurations (for example, radio resource configuration, system information or the like) to add the NR eNB 204B as a target MeNB as well as configurations (for example, radio resource configuration, system information or the like) to add LTE eNB 202B as a target SeNB. At step 810, the UE 300 performs a random access procedure in order to establish a connection with the NR eNB 204B. At step 812, the UE 300 transmits an RCC connection reconfiguration completion signal indicating that the RCC connection reconfiguration is complete to the NR eNB 204B. At step 814, the UE 300 performs a random access procedure in order to establish a connection with the LTE eNB 202B. At step 816, the NR eNB 204B transmits a SeNB reconfiguration completion signal to the LTE eNB 204B. This indicates to the LTE eNB 204B that the reconfiguration to make the LTE eNB 204B the SeNB in the interworking arrangement with the NR eNB 202B as MeNB is complete. At steps 818 and 820, the LTE eNB 202A forwards, respectively, relevant control plane signalling and user plane data to the LTE eNB 202B at the RAN level using LTE. It will be appreciated that, alternatively, in the case that there is no RAN level interface between eNB 202A and eNB 202B, then the control plane signalling and user plane data may be forwarded via the core network. In this case, user plane data is forwarded via the eNB 204B (as the T-MeNB) in the case that the user plane is split at the RAN level or directly to the eNB 202B (as the T-SeNB) in the case that the user plane is split at the CN level. Similarly, at steps 822 and 824, the NR eNB 204A forwards, respectively, relevant control plane signalling and user plane data to the NR eNB 204B at the RAN level using NR. Alternatively, in the case that there is no RAN level interface between eNB 204A and eNB 204B, secondary cell group (SCG) data packets for the eNB 204A (when the eNB 204A belongs to a SCG) may be discarded, or, as the radio link between the UE and eNB 204A is still alive at this stage of the signalling flow, if the user plane is split at the CN level, then SCG data packets can continuously be exchanged with the UE 300 via the eNB 204A (as the S-SeNB) until handover is complete. At step 826, a path update procedure is implemented. At step 828, an S-SeNB release procedure is implemented. This releases the NR eNB 204A as S-SeNB, thus ending the interworking arrangement between the LTE eNB 202A and the NR eNB 204A. At step 830, the NR eNB 204B (now the MeNB, with the LTE eNB 202B as the SeNB) transmits a UE context release signal to the LTE eNB 202A (as source MeNB). The LTE eNB 202A then transmits a context release signal to the NR eNB 204A (as source SeNB) at step 832. This completes the handover procedure.

Figure 10:
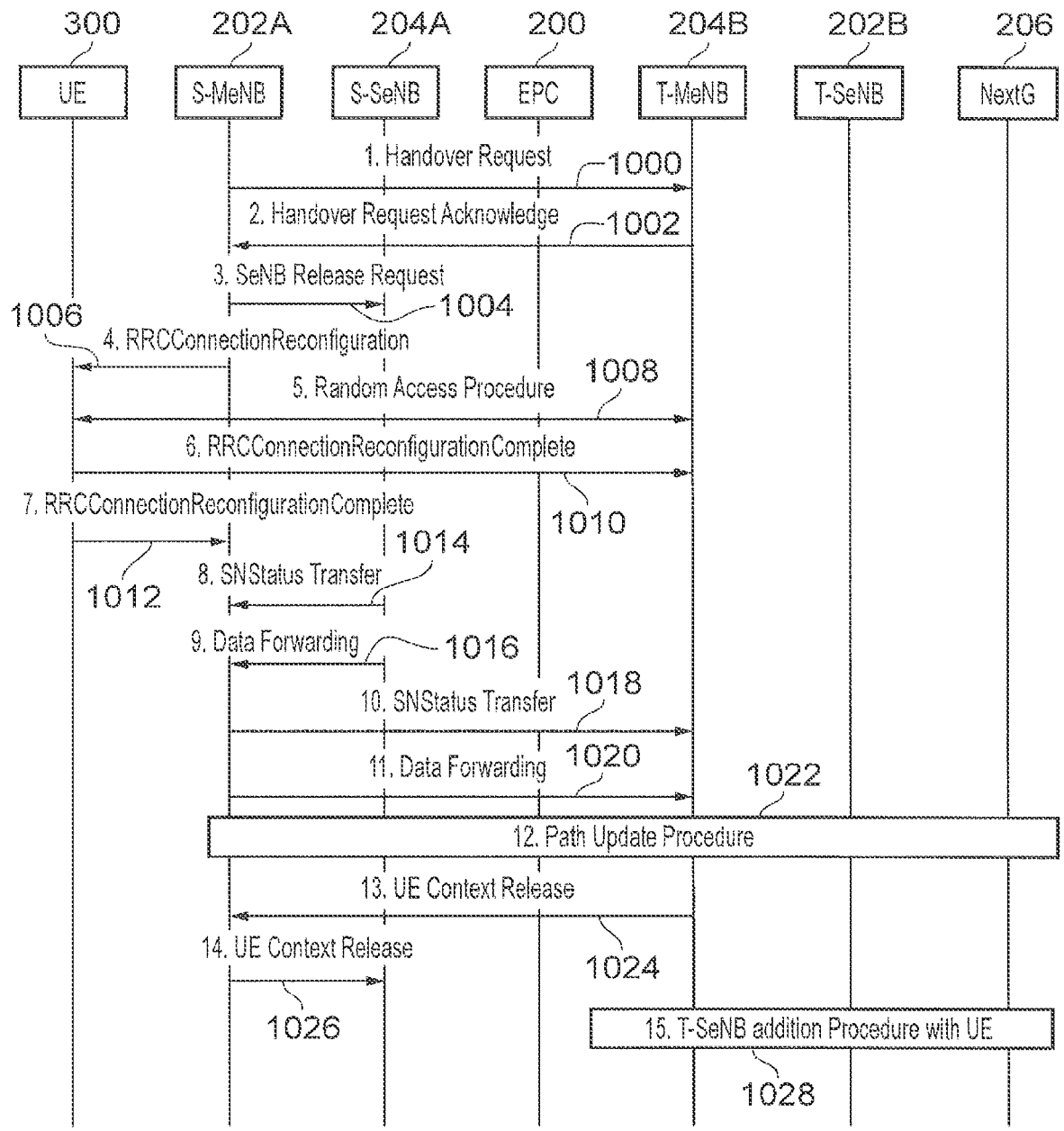
FIG. 10 schematically shows a second example signalling flow associated with the embodiment of FIG. 8.

An second example signal flow between the UE 300, LTE eNB 202A, LTE eNB 202B, NR eNB 204A, NR eNB 204B, core network 206 and core network 200 implemented by the embodiment of FIG. 8 is shown in FIG. 10. With this scheme, the S-SeNB (in this case, the NR eNB 204A) is released much earlier during the handover procedure. In this case, the source MeNB (in this case, LTE eNB 202A) will forward the data packets from itself as well as the data packets from the source SeNB (in this case, NR eNB 204A) to the target MeNB (in this case, LTE eNB 202B). The target SeNB cells may then be added after the handover to the target MeNB is complete, for example. A detailed description of FIG. 10 is now provided.

At step 1000, a handover request signal is transmitted from the LTE eNB 202A to the NR eNB 204B. The handover request signal may be transmitted via the CN 200 (as an example of a first core network) and CN 206 (as an example of a second core network) in the case that there is a control interface between the two CNs, for example. Alternatively, in the case that there is a RAN level interface between eNB 202A and eNB 204B (for example, in the case that both eNBs used LTE or NR), then it will be appreciated that the handover request signal could be transmitted directly from eNB 202A (as S-MeNB) to eNB 204B (as T-MeNB) using this RAN level interface. At step 1002, a handover request acknowledgement signal is transmitted from the NR eNB 204B to the LTE eNB 202A. Again, the handover request acknowledgement signal may be transmitted via the CNs 200 and 206 in the case that there is a control interface between the two CNs, for example. Alternatively, in the case that there is a RAN level interface between eNB 202A and eNB 204B (for example, in the case that both eNBs used LTE or NR), then it will be appreciated that the handover request acknowledgement signal could be transmitted directly from eNB 204B (as T-MeNB) to eNB 202A (as S-MeNB) using this RAN level interface. At step 1004, an S-SeNB release signal is transmitted from the LTE eNB 202A (as S-MeNB) to the NR eNB 204A (as S-SeNB). This signal indicates to the NR eNB 204A that it is to be released as S-SeNB, thus ending the interworking arrangement between the LTE eNB 202A and the NR eNB 204A. At step 1006, an RRC connection reconfiguration signal is transmitted from the LTE eNB 202A to the UE 300. The RRC connection reconfiguration signal may include configurations (for example, radio resource configuration, system information or the like) to add the NR eNB 204B as a target MeNB as well as configurations (for example, radio resource configuration, system information or the like) to release the NR eNB 204A as a source SeNB. At step 1008, the UE 300 performs a random access procedure in order to establish a connection with the NR eNB 204B. At steps 1010 and 1012, the UE 300 transmits an RCC connection reconfiguration completion signal indicating that the RCC connection reconfiguration is complete to, respectively, the NR eNB 204B (as T-MeNB) and the LTE eNB 202A (as S-MeNB). At steps 1014 and 1016, the NR eNB 204A (as S-SeNB) forwards, respectively, relevant control plane signalling and user plane data to the LTE eNB 202A (as S-MeNB). At steps 1018 and 1020, the LTE eNB 202A (as S-MeNB) forwards, respectively, relevant control plane signalling and user plane data to the NR eNB 204B (as T-MeNB). The data packets forwarded in this case include data packets from the LTE eNB 202A as well as data packets from the NR eNB 204A. The forwarding of control plane signalling and user plane data in steps 1018 and 1020 may be carried out via the CNs 200 and 206 in the case that there is a control interface between the two CNs, for example. Alternatively, in the case that there is a RAN level interface between eNB 202A and eNB 204B (for example, in the case that both eNBs used LTE or NR), then it will be appreciated that the handover request signal could be transmitted directly from eNB 202A (as S-MeNB) to eNB 204B (as T-MeNB) using this RAN level interface. At step 1022, a path update procedure is implemented. At step 1024, the NR eNB 204B (as target MeNB) transmits a UE context release signal to the LTE eNB 202A (as source MeNB). The LTE eNB 202A (as source MeNB) then transmits a context release signal to the NR eNB 204A (as source SeNB) at step 832. This completes the handover procedure so that the NR eNB 204B is now the MeNB. A suitable target SeNB (this being LTE eNB 202B in the example of FIG. 8) is then added at step 1028 using a suitable procedure. In an alternative example, if the NR eNB 204B (as target MeNB) knows which target SeNB cell could be added for the UE (for example, based on UE downlink (DL) measurement reporting or the measurement of an uplink (UL) reference signal from the UE), then the target SeNB addition procedure could be implemented at an earlier stage during the signalling flow (rather than at step 1028). For example, the eNB 204B (as T-MeNB) could notify eNB 202A (as S-MeNB) of the identity of the target SeNB, and the RRC connection reconfiguration signal transmitted from the eNB 202A to the UE 300 at step 1006 could include configurations (for example, radio resource configuration, system information or the like) for adding the target SeNB.

In the above-described examples, various implementations of handover of the UE 300 in accordance with the present technique are described. Of course, it will be appreciated that before such handover can be implemented, it must be decided to undertake a handover operation in the first place. It is envisaged that handover can be initiated on the basis of the measurement of downlink or uplink signals.

In the case of downlink measurement, the serving cell of the UE 300 (which may be the MeNB or SeNB of an interworking arrangement) will configure the UE to perform an inter-RAT measurement by, for example, dedicated signalling. In this case, the UE will perform a suitable measurement on the signal strength and/or quality of a downlink reference signal transmitted from each eNB it its vicinity, whether that eNB is operating under a first RAT (for example, LTE) or a second RAT (for example, NR). The UE 300 will then generate a measurement report and transmit this measurement report to the serving cell. On the basis of this measurement report, the serving cell (or another suitable component of the network, such as the CN 200 or 206) then determines whether a handover is necessary. For example, in the above-described examples, it may be determined that a handover is necessary from the NR eNB 204A (as SeNB) interworking with the LTE eNB 202A (as MeNB) to the LTE eNB 202B (as SeNB) interworking with the NR eNB 204B (as MeNB) when the measurement report indicates that a reference signal from the NR eNB 204B has a better strength and/or quality than the reference signal from the LTE eNB 202A. Handover is then initiated by the LTE eNB 202A by transmission of a handover request signal, as previously described.

In the case of uplink measurement, handover is initiated on the basis of an uplink reference signal transmitted from the UE 300. The transmission of the UE uplink reference signal may be implemented in one of a number of ways.

In one example, the UE 300 is configured to generate a measurement report and transmit the measurement report to the serving cell in the same way as for the downlink measurement case described in the previous paragraph. However, in this case, in response to it being determined that handover should take place (due to, for example, a deteriorating signal strength and/or quality of the radio link with the serving cell), instead of the serving cell or CN determining the target eNB for handover on the basis of information in the measurement report, the UE is configured (by dedicated signalling or the like) to begin transmitting an uplink reference signal (in the form of a beacon signal, for example). This uplink reference signal is then measured by the eNBs in the vicinity of the UE so as to allow handover to be made to a target eNB with the highest measured signal strength and/or quality of the uplink reference signal. This example may be particularly relevant to handover from LTE to NR, since it uses the existing downlink measurement reporting of LTE in order to determine that handover is necessary (due to, for example, a deteriorating signal strength and/or quality of the radio link with the LTE serving cell), but then determines the target eNB on the basis of an uplink reference signal transmitted by the UE, thus allowing handover to an NR eNB for NR configurations which utilise UE uplink reference signals in order to carry out handover operations. Such an arrangement thus allows existing provisions in LTE (namely, downlink measurement reporting) to be used in order to implement inter-RAT mobility.

In another example, a similar arrangement exists. However, this time, instead of the need for handover being determined on the basis of downlink measurement reporting, the need for handover is determined on the basis of the measurement of an uplink reference signal by the serving cell. That is, the UE transmits an uplink reference signal which is measured by the serving cell so as to determine whether handover should take place. In response to it being determined that handover should take place (due to, for example, a deteriorating signal strength and/or quality of the radio link with the serving cell, as determined on the basis of the uplink reference signal), this uplink reference signal is measured by the eNBs in the vicinity of the UE so as to allow handover to be made to a target eNB with the highest measured signal strength and/or quality of the uplink reference signal. In this case, for example, the serving cell may configure its neighbouring cells to measure the uplink reference signal from the UE. Each of the neighbour cells will then generate a measurement report of the uplink reference signal and send corresponding measurement report to the serving cell, thus allowing the serving cell to make a decision on the target eNB for the handover. It is noted that the UE 300 may be configured to continuously or periodically (on the basis of discontinuous transmission (DTX) or the like) transmit the uplink reference signal. Alternatively, the UE 300 may be configured to initiate transmission of the uplink reference signal in response to it reaching the edge of coverage of its current cell. This may be carried out on the basis of UE location reporting, for example.

It will be appreciated that, although the above-described examples are directed to handover from NR interworking in LTE to LTE interworking in NR, the same examples would also apply from, for example, handover from LTE interworking in NR to NR interworking in LTE. More generally, it will be appreciated that the above-described examples may apply to handover from a first RAT interworking in a second RAT to the second RAT interworking in the first RAT, wherein the first and second RATs are different.

Figure 11:
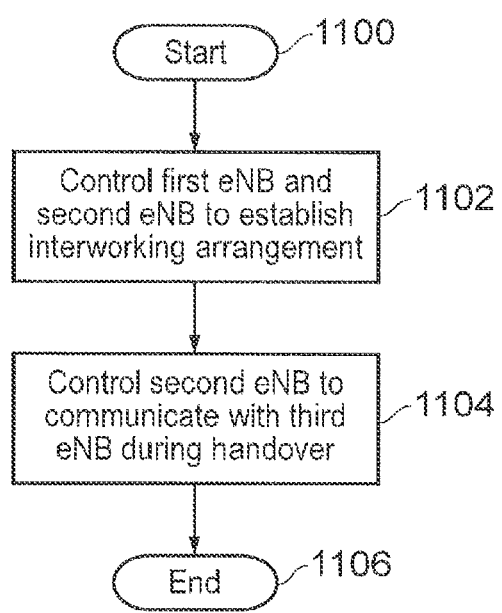
FIG. 11 shows a flow chart schematically illustrating a process according to the present technique.

FIG. 11 shows a flow chart schematically illustrating a process according to the present technique. The process starts at step 1100. At step 1102, first infrastructure equipment (such as LTE eNB 202A) operable to communicate with a terminal device (such as UE 300) using a first RAT and second infrastructure equipment (such as NR eNB 204A) operable to communicate with the terminal device using a second RAT are controlled to form an interworking arrangement in which the first infrastructure equipment is a master infrastructure equipment with which control plane signalling and user plane data is exchangeable with the terminal device and the second infrastructure equipment is a secondary infrastructure equipment with which user plane data is exchangeable with the terminal device. At step 1104, during a handover procedure for handover from the first infrastructure equipment as a source master infrastructure equipment to third infrastructure equipment (such as NR eNB 204B) as a target master infrastructure equipment, the second infrastructure equipment is controlled to communicate with the third infrastructure equipment using the second RAT so as to allow information necessary for completing the handover to be exchanged between the first infrastructure equipment and the third infrastructure equipment via the second infrastructure equipment. The process then ends at step 1106.

Embodiments of the present disclosure can be summarised in the following numbered paragraphs:

1. A wireless telecommunications system comprising:
   a terminal device;
   a first infrastructure equipment operable to communicate with the terminal device using a first radio access technology (RAT) and second infrastructure equipment operable to communicate with the terminal device using a second RAT, the first RAT being different to the second RAT, wherein the first infrastructure equipment and second infrastructure equipment form an interworking arrangement in which the first infrastructure equipment is a master infrastructure equipment with which control plane signalling and user plane data is exchangeable with the terminal device and the second infrastructure equipment is a secondary infrastructure equipment with which user plane data is exchangeable with the terminal device; and
   a third infrastructure equipment operable to communicate with the terminal device using the second RAT;
   wherein:
   during a handover procedure for handover from the first infrastructure equipment as a source master infrastructure equipment to the third infrastructure equipment as a target master infrastructure equipment, the second infrastructure equipment is operable to communicate with the third infrastructure equipment using an interface associated with the second RAT so as to allow information necessary for completing the handover to be exchanged between the first infrastructure equipment and the third infrastructure equipment via the second infrastructure equipment.

2. A wireless telecommunications system according to claim 1, wherein the handover procedure comprises:
   a first handover from the first infrastructure equipment as a source master infrastructure equipment to the second infrastructure equipment as a target master infrastructure equipment, wherein information necessary for completing the first handover is exchanged between the first infrastructure equipment and the second infrastructure equipment on the basis of the interworking arrangement formed by the first infrastructure equipment and the second infrastructure equipment; and
   a second handover from the second infrastructure equipment as a source master infrastructure equipment to the third infrastructure equipment as a target master infrastructure equipment, wherein information necessary for completing the second handover is exchanged between the second infrastructure equipment and the third infrastructure equipment using the interface associated with the second RAT.

3. A wireless telecommunications system according to claim 1, comprising:
   a fourth infrastructure equipment operable to communicate with the terminal device using the first RAT, wherein the third infrastructure equipment and fourth infrastructure equipment are operable to form an interworking arrangement in which the third infrastructure equipment is a master infrastructure equipment with which control plane signalling and user plane data is exchangeable with the terminal device and the fourth infrastructure equipment is a secondary infrastructure equipment with which user plane data is exchangeable with the terminal device;
   wherein:
   the information necessary for completing the handover which is exchanged between the first infrastructure equipment and the third infrastructure equipment via the second infrastructure equipment comprises handover related control signalling.

4. A wireless telecommunications system according to claim 3, wherein, during the handover procedure:
the first infrastructure equipment is operable to communicate with the fourth infrastructure equipment using an interface associated with the first RAT so as to allow further information necessary for completing the handover from the first infrastructure equipment as a source master infrastructure equipment to the third infrastructure equipment as a target master infrastructure equipment to be exchanged between the first infrastructure equipment and the fourth infrastructure equipment; and
the second infrastructure equipment is operable to communicate with the third infrastructure equipment using the interface associated with the second RAT so as to allow further information necessary for completing the handover from the first infrastructure equipment as a source master infrastructure equipment to the third infrastructure equipment as a target master infrastructure equipment to be exchanged between the second infrastructure equipment and the third infrastructure equipment.

5. A wireless telecommunications system comprising:
a terminal device;
first infrastructure equipment operable to communicate with the terminal device using a first radio access technology (RAT), wherein the first infrastructure equipment is operable to communicate with a first core network, and wherein the first infrastructure equipment is operable to form an interworking arrangement with second infrastructure equipment of the wireless telecommunications network in which the first infrastructure equipment is a master infrastructure equipment with which control plane signalling and user plane data is exchangeable with the terminal device and the second infrastructure equipment is a secondary infrastructure equipment with which user plane data is exchangeable with the terminal device; and
a third infrastructure equipment operable to communicate with the terminal device using a second RAT, wherein the second RAT is different to the first RAT, and wherein the third infrastructure equipment is operable to communicate with a second core network;
wherein:
during a handover procedure for handover from the first infrastructure equipment as a source master infrastructure equipment to the third infrastructure equipment as a target master infrastructure equipment, the first infrastructure equipment and third infrastructure equipment are configured to exchange information necessary for completing the handover via the first and second core networks.

6. A wireless telecommunications system according to claim 5, wherein the first and second core networks are the same core network.

7. A wireless telecommunications system according to claim 5, wherein the second core network is different to the first core network and the first and second core networks are in communication with each other via a control interface.

8. A wireless telecommunications system comprising:
a terminal device;
first infrastructure equipment operable to communicate with the terminal device using a first radio access technology (RAT) and second infrastructure equipment operable to communicate with the terminal device using a second RAT, the first RAT being different to the second RAT, wherein the first infrastructure equipment and second infrastructure equipment form an interworking arrangement in which the first infrastructure equipment is a master infrastructure equipment with which control plane signalling and user plane data is exchangeable with the terminal device and the second infrastructure equipment is a secondary infrastructure equipment with which user plane data is exchangeable with the terminal device; wherein
during a handover procedure from the first infrastructure equipment as the master infrastructure equipment of the interworking arrangement to the second infrastructure equipment as the master infrastructure equipment of the interworking arrangement, the first infrastructure equipment is operable to exchange signals with the second infrastructure equipment using the interworking arrangement so as to allow information necessary for completing the handover to be exchanged between the first infrastructure equipment and the second infrastructure equipment.

9. A wireless telecommunications system according to any preceding claim, wherein the first RAT is Long Term Evolution (LTE) and the second RAT is a New Radio Access Technology (NR).

10. A wireless telecommunications system according to claim 4, wherein:
the first RAT is Long Term Evolution (LTE) and the second RAT is a New Radio Access Technology (NR);
the further information to be exchanged between the first infrastructure equipment and the fourth infrastructure equipment comprises control plane signalling and user plane data which are forwarded from the first infrastructure equipment to the fourth infrastructure equipment; and the further information to be exchanged between the second infrastructure equipment and the third infrastructure equipment comprises control plane signalling and user plane data which are forwarded from the second infrastructure equipment to the third infrastructure equipment.

11. A terminal device for use with a wireless telecommunications system according to any preceding claim.

12. Infrastructure equipment for use with a wireless telecommunications system according to any preceding claim.

13. A method of operating a wireless telecommunications system comprising a terminal device, first infrastructure equipment operable to communicate with the terminal device using a first radio access technology (RAT), second infrastructure equipment operable to communicate with the terminal device using a second RAT, the first RAT being different to the second RAT, and third infrastructure equipment operable to communicate with the terminal device using the second RAT, wherein the method comprises:
controlling the first infrastructure equipment and second infrastructure equipment to form an interworking arrangement in which the first infrastructure equipment is a master infrastructure equipment with which control plane signalling and user plane data is exchangeable with the terminal device and the second infrastructure equipment is a secondary infrastructure equipment with which user plane data is exchangeable with the terminal device; and
controlling, during a handover procedure for handover from the first infrastructure equipment as a source master infrastructure equipment to the third infrastructure equipment as a target master infrastructure equipment, the second infrastructure equipment to communicate with the third infrastructure equipment using an interface associated with the second RAT so as to allow information necessary for completing the handover to be exchanged between the first infrastructure equipment and the third infrastructure equipment via the second infrastructure equipment.

14. A method of operating a wireless telecommunications system comprising a terminal device, first infrastructure equipment, second infrastructure equipment and third infrastructure equipment, wherein the first infrastructure equipment is operable to communicate with the terminal device using a first radio access technology (RAT) and to communicate with a first core network, and wherein the third infrastructure equipment is operable to communicate with the terminal device using a second RAT, wherein the second RAT is different to the first RAT, and wherein the third infrastructure equipment is operable to communicate with a second core network, the second core network being different to the first core network, wherein the method comprises:
  controlling the first infrastructure equipment to form an interworking arrangement with the second infrastructure equipment of the wireless telecommunications network in which the first infrastructure equipment is a master infrastructure equipment with which control plane signalling and user plane data is exchangeable with the terminal device and the second infrastructure equipment is a secondary infrastructure equipment with which user plane data is exchangeable with the terminal device; and
  controlling, during a handover procedure for handover from the first infrastructure equipment as a source master infrastructure equipment to the third infrastructure equipment as a target master infrastructure equipment, the first infrastructure equipment and third infrastructure equipment to exchange information necessary for completing the handover via the first and second core networks, the first and second core networks being in communication with each other via a control interface.

15. A method of operating a wireless telecommunications system comprising a terminal device, first infrastructure equipment operable to communicate with the terminal device using a first radio access technology (RAT) and second infrastructure equipment operable to communicate with the terminal device using a second RAT, the first RAT being different to the second RAT, wherein the method comprises:
  controlling the first infrastructure equipment and second infrastructure equipment to form an interworking arrangement in which the first infrastructure equipment is a master infrastructure equipment with which control plane signalling and user plane data is exchangeable with the terminal device and the second infrastructure equipment is a secondary infrastructure equipment with which user plane data is exchangeable with the terminal device; and
  during a handover procedure from the first infrastructure equipment as a source master infrastructure equipment of the interworking arrangement to the second infrastructure equipment as a target master infrastructure equipment of the interworking arrangement, controlling the first infrastructure equipment to exchange signals with the second infrastructure equipment using the interworking arrangement so as to allow information necessary for completing the handover to be exchanged between the first infrastructure equipment and the second infrastructure equipment.

16. Integrated circuitry for a wireless telecommunications system comprising a terminal device, first infrastructure equipment operable to communicate with the terminal device using a first radio access technology (RAT), second infrastructure equipment operable to communicate with the terminal device using a second RAT, the first RAT being different to the second RAT, and third infrastructure equipment operable to communicate with the terminal device using the second RAT, wherein the integrated circuitry is operable to:
  control the first infrastructure equipment and second infrastructure equipment to form an interworking arrangement in which the first infrastructure equipment is a master infrastructure equipment with which control plane signalling and user plane data is exchangeable with the terminal device and the second infrastructure equipment is a secondary infrastructure equipment with which user plane data is exchangeable with the terminal device; and
  control, during a handover procedure for handover from the first infrastructure equipment as a source master infrastructure equipment to the third infrastructure equipment as a target master infrastructure equipment, the second infrastructure equipment to communicate with the third infrastructure equipment using an interface associated with the second RAT so as to allow information necessary for completing the handover to be exchanged between the first infrastructure equipment and the third infrastructure equipment via the second infrastructure equipment.

17. Integrated circuitry for operating a wireless telecommunications system comprising a terminal device, first infrastructure equipment, second infrastructure equipment and third infrastructure equipment, wherein the first infrastructure equipment is operable to communicate with the terminal device using a first radio access technology (RAT) and to communicate with a first core network, and wherein the third infrastructure equipment is operable to communicate with the terminal device using a second RAT, wherein the second RAT is different to the first RAT, and wherein the third infrastructure equipment is operable to communicate with a second core network, the second core network being different to the first core network, wherein the integrated circuitry is operable to:
  control the first infrastructure equipment to form an interworking arrangement with the second infrastructure equipment of the wireless telecommunications network in which the first infrastructure equipment is a master infrastructure equipment with which control plane signalling and user plane data is exchangeable with the terminal device and the second infrastructure equipment is a secondary infrastructure equipment with which user plane data is exchangeable with the terminal device; and
  control, during a handover procedure for handover from the first infrastructure equipment as a source master infrastructure equipment to the third infrastructure equipment as a target master infrastructure equipment, the first infrastructure equipment and third infrastructure equipment to exchange information necessary for completing the handover via the first and second core networks, the first and second core networks being in communication with each other via a control interface.

18. Integrated circuitry for a wireless telecommunications system comprising a terminal device, first infrastructure equipment operable to communicate with the terminal device using a first radio access technology (RAT) and second infrastructure equipment operable to communicate with the terminal device using a second RAT, the first RAT being different to the second RAT, wherein the integrated circuitry is operable to:

control the first infrastructure equipment and second infrastructure equipment to form an interworking arrangement in which the first infrastructure equipment is a master infrastructure equipment with which control plane signalling and user plane data is exchangeable with the terminal device and the second infrastructure equipment is a secondary infrastructure equipment with which user plane data is exchangeable with the terminal device; and during a handover procedure from the first infrastructure equipment as a source master infrastructure equipment of the interworking arrangement to the second infrastructure equipment as a target master infrastructure equipment of the interworking arrangement, control the first infrastructure equipment to exchange signals with the second infrastructure equipment using the interworking arrangement so as to allow information necessary for completing the handover to be exchanged between the first infrastructure equipment and the second infrastructure equipment.

It will be appreciated that numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry and/or processors. However, it will be apparent that any suitable distribution of functionality between different functional units, circuitry and/or processors may be used without detracting from the embodiments.

Described embodiments may be implemented in any suitable form including hardware, software, firmware or any combination of these. Described embodiments may optionally be implemented at least partly as computer software running on one or more data processors and/or digital signal processors. The elements and components of any embodiment may be physically, functionally and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

REFERENCES

[1] Holma H. and Toskala A, "LTE for UMTS OFDMA and SC-FDMA based radio access", John Wiley and Sons, 2009

[2] RP-160671: New SID Proposal: Study on New Radio Access Technology

[3] R2-162364. Deployment Scenarios for Interworking. Nokia, Alcatel-Lucent Shanghai Bell.

The invention claimed is:

1. A terminal device for use with a wireless telecommunications system, comprising:
    circuitry configured to
        communicate with a first infrastructure equipment operable using a first radio access technology (RAT),
        communicate with a second infrastructure equipment using a second RAT, wherein the first RAT is different than the second RAT,
        communicate with a third infrastructure equipment, wherein control plane signaling and user plan data is exchangeable between the third infrastructure and the terminal device, and
        communicate with a fourth infrastructure equipment using the first RAT, wherein user plan data is exchangeable between the fourth infrastructure and the terminal device,
        wherein during a handover procedure for handover from the first infrastructure equipment as a source master infrastructure equipment to the third infrastructure equipment as a target master infrastructure equipment, the second infrastructure equipment is operable to communicate with the third infrastructure equipment using an interface so as to allow information necessary for completing the handover to be transferred between the first infrastructure equipment and the third infrastructure equipment via the second infrastructure equipment.

2. The terminal device according to claim 1, wherein the information necessary for completing the handover which is transferred between the first infrastructure equipment and the third infrastructure equipment via the second infrastructure equipment comprises handover related control signaling.

3. The terminal device according to claim 1, wherein the handover procedure includes
    a first handover from the first infrastructure equipment as a source master infrastructure equipment to the second infrastructure equipment as a target master infrastructure equipment, wherein information necessary for completing the first handover is exchanged between the first infrastructure equipment and the second infrastructure equipment based on the interworking arrangement formed by the first infrastructure equipment and the second infrastructure equipment; and
    a second handover from the second infrastructure equipment as a source master infrastructure equipment to the third infrastructure equipment as a target master infrastructure equipment, wherein information necessary for completing the second handover is exchanged between the second infrastructure equipment and the third infrastructure equipment using the control interface.

4. The terminal device according to claim 1, wherein the first RAT is Long Term Evolution (LTE) and the second RAT is a New Radio Access Technology (NR).

5. Infrastructure equipment for use with a wireless telecommunications system, comprising:
    a first infrastructure equipment operable to communicate with a terminal device using a first radio access technology (RAT); and
    a second infrastructure equipment operable to communicate with the terminal device using a second RAT, wherein the first RAT is different than the second RAT, a third infrastructure equipment operable to communicate with the terminal device, wherein control plane signaling and user plan data is exchangeable between the third infrastructure and the terminal device, and a fourth infrastructure equipment operable to communicate with the terminal device using the first RAT, wherein user plan data is exchangeable between the fourth infrastructure and the terminal device, wherein during a handover procedure for handover from the first infrastructure equipment as a source master infrastructure equipment to the third infrastructure equipment as a target master infrastructure equipment, the second infrastructure equipment is operable to communicate with the third infrastructure equipment using an interface so as to allow information necessary for completing the handover to be transferred between the first infrastructure equipment and the third infrastructure equipment via the second infrastructure equipment.

6. The infrastructure equipment of claim 5, wherein the handover procedure includes a first handover from the first infrastructure equipment as a source master infrastructure equipment to the second infrastructure equipment as a target master infrastructure equipment, wherein information necessary for completing the first handover is exchanged between the first infrastructure equipment and the second infrastructure equipment based on the interworking arrangement formed by the first infrastructure equipment and the second infrastructure equipment; and a second handover from the second infrastructure equipment as a source master infrastructure equipment to the third infrastructure equipment as a target master infrastructure equipment, wherein information necessary for completing the second handover is exchanged between the second infrastructure equipment and the third infrastructure equipment using the interface associated with the second RAT.

7. A method of operating a wireless telecommunications system comprising a terminal device, first infrastructure equipment operable to communicate with the terminal device using a first radio access technology (RAT) and second infrastructure equipment operable to communicate with the terminal device using a second RAT, the first RAT being different to the second RAT, wherein the method comprises:

controlling the first infrastructure equipment and second infrastructure equipment to form an interworking arrangement in which the first infrastructure equipment is a master infrastructure equipment with which control plane signaling and user plane data is exchangeable with the terminal device and the second infrastructure equipment is a secondary infrastructure equipment with which user plane data is exchangeable with the terminal device;

controlling a fourth infrastructure equipment operable to communicate with the terminal device using the first RAT, wherein the third infrastructure equipment and fourth infrastructure equipment are operable to form an interworking arrangement in which the third infrastructure equipment is a master infrastructure equipment with which control plane signaling and user plane data is exchangeable with the terminal device and the fourth infrastructure equipment is a secondary infrastructure equipment with which user plane data is exchangeable with the terminal device; and controlling, during a handover procedure from the first infrastructure equipment as a source master infrastructure equipment of the interworking arrangement to the second infrastructure equipment as a target master infrastructure equipment of the interworking arrangement, the first infrastructure equipment to exchange signals with the second infrastructure equipment using the interworking arrangement so as to allow information necessary for completing the handover to be exchanged between the first infrastructure equipment and the second infrastructure equipment.

8. The method of claim 7, wherein the wireless telecommunications system includes third infrastructure equipment.

9. The method of claim 8, further comprising:
communicating, by the third infrastructure equipment, with the terminal device.

10. The method of claim 8, further comprising:
communicating, by the first infrastructure equipment, with a first core network.

11. The method of claim 10, further comprising:
communicating, by the third infrastructure equipment, with a second core network.

12. The method of claim 11, wherein the second core network is different than the first core network, further comprising:
transferring, between the first and third infrastructure equipment, information necessary for completing the handover via the first and second core networks.

13. The method of claim 11, wherein the second core network and the first core network are the same core network.

14. The method of claim 8, wherein the information necessary for completing the handover which is transferred between the first infrastructure equipment and the third infrastructure equipment via the second infrastructure equipment comprises handover related control signaling.

15. The method of claim 8, wherein controlling the handover procedure includes controlling a first handover from the first infrastructure equipment as a source master infrastructure equipment to the second infrastructure equipment as a target master infrastructure equipment, wherein information necessary for completing the first handover is exchanged between the first infrastructure equipment and the second infrastructure equipment based on the interworking arrangement formed by the first infrastructure equipment and the second infrastructure equipment; and a second handover from the second infrastructure equipment as a source master infrastructure equipment to the third infrastructure equipment as a target master infrastructure equipment, wherein information necessary for completing the second handover is transferred between the second infrastructure equipment and the third infrastructure equipment using the control interface.

16. The method of claim 7, wherein the first RAT is Long Term Evolution (LTE) and the second RAT is a New Radio Access Technology (NR).

17. The infrastructure equipment of claim 5, wherein the information necessary for completing the handover which is exchanged between the first infrastructure equipment and the third infrastructure equipment via the second infrastructure equipment comprises handover related control signaling.

18. The infrastructure equipment of claim 5, wherein during the handover procedure the first infrastructure equipment is operable to communicate with the fourth infrastructure equipment using an interface associated with the first RAT so as to allow further information necessary for completing the handover from the first infrastructure equipment as a source master infrastructure equipment to the third infrastructure equipment as a target master infrastructure equipment to be exchanged between the first infrastructure equipment and the fourth infrastructure equipment.

19. The infrastructure equipment of claim 18, wherein during the handover procedure the second infrastructure equipment is operable to communicate with the third infrastructure equipment using the interface associated with the second RAT so as to allow further information necessary for completing the handover from the first infrastructure equipment as a source master infrastructure equipment to the third infrastructure equipment as a target master infrastructure equipment to be exchanged between the second infrastructure equipment and the third infrastructure equipment.

\* \* \* \* \*